Jan. 8, 1929.　　　　　　　　　　　　　　　　1,698,338
S. LEWIN
MILK BOTTLE POURING CAP
Filed May 9, 1927
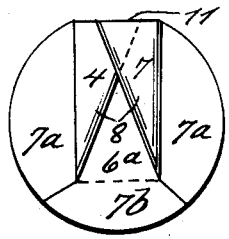
Fig. 7.
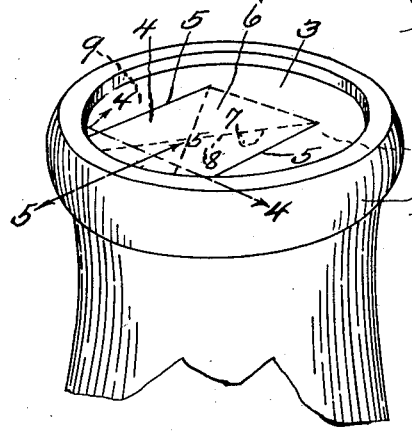
Fig. 1.
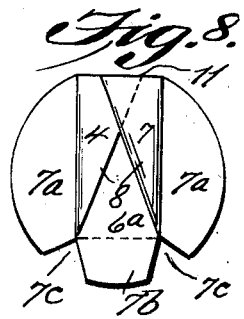
Fig. 8.
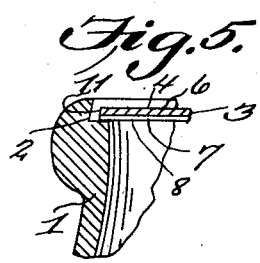
Fig. 5.
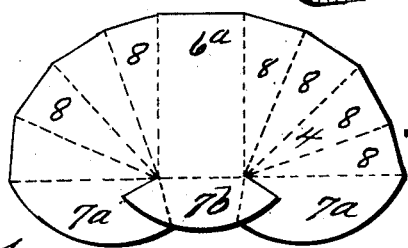
Fig. 4.
Fig. 3.
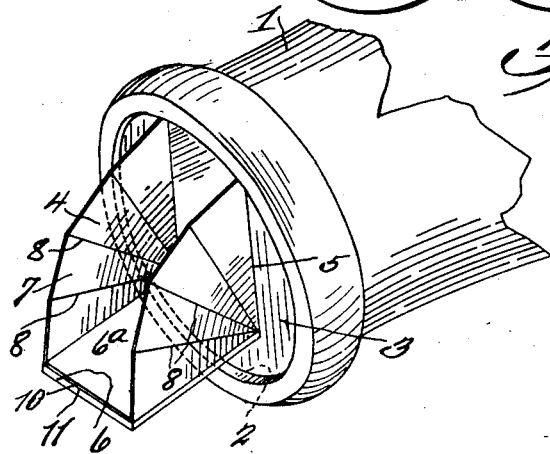
Fig. 6.
Fig. 2.
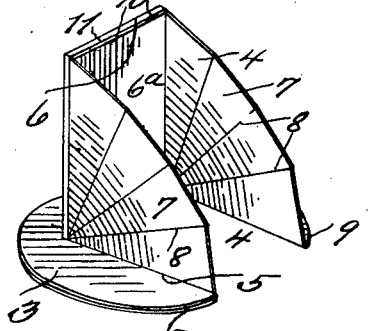
Fig. 3.
Samuel Lewin,
INVENTOR
BY Victor J. Evans
His ATTORNEY Patented Jan. 8, 1929.

1,698,338

UNITED STATES PATENT OFFICE.

SAMUEL LEWIN, OF PHILADELPHIA, PENNSYLVANIA.

MILK-BOTTLE POURING CAP.

Application filed May 9, 1927. Serial No. 190,047.

The present invention relates to an improved milk bottle pouring cap and one which is sanitary in every respect. It is a fact, though it is not guarded against, that the mouth of a milk bottle is one of the greatest germ carriers. Milk bottles without being washed are very often left on the door step of homes, and in these homes there may be consumptives, or others who might have diphtheria or any other contagious disease, and very often the mouth of the bottle is handled by those persons, some drink from the mouth of the bottle, and then the milkman with dirty hands will pick up the bottle at the mouth end thereof, and with the same hand grasp a fresh bottle of milk by the mouth end and place it at the next home. It is also a fact that many, before opening a bottle of milk, hardly ever wipe or wash or sterilize the mouth end of the bottle by holding it under the hot water spigot, before removing the cap. However, all bottles before they are filled are thoroughly sterilized, and they are never handled until after they are capped, the caps being applied by a standard capping machine, hence there is no chance for germs to collect within the mouth of the bottle, and as the caps are made of sanitary fibre, the interior of the bottle and under the cap are thoroughly sanitary. Most bottles are capped with a solid disc, with a lip whereby the disc may be removed, and in this case the milk from the bottle pours over the exterior of the mouth end of the bottle collecting germs, and therefore carrying disease.

The present invention aims to avoid these objectionable features of all previous caps, and to accomplish this result it is the purpose to provide an improved milk bottle pouring cap provided with a collapsible spout, which may be easily opened, and when opened the milk will not contact with any part of the exterior of the mouth of the bottle, therefore, avoiding carrying bacteria germs.

Another purpose of the invention is to provide a cap which can be easily applied, and without changing the now universally used bottle capping machines, the fact being that the herein improved cap can be applied to milk bottles as easily as the now used solid disc cap, and without having a specially designed bottling and capping machine.

Still another purpose is to provide a milk bottle pouring cap, wherein the pouring spout at its free edge is straight, not conforming to the curvature of the bottle, so that easy access may be had to the edge of the spout, so that the pouring spout may be easily and very conveniently opened. For example, a pointed instrument may be inserted between the straight edge of the pouring spout and the annular surface of the bottle for the purpose of prying open the pouring spout. Furthermore, by having the straight edge enabling the instrument to be inserted, the instrument contacting with the surface of the shoulder on which the cap engages, guards against the operator engaging the instrument with the cap, avoiding the cap being pushed or depressed inwardly of the bottle and causing a splashing of the milk.

It is the aim to construct this improved cap of suitable paraffine paper or cardboard, thoroughly treated for counteracting the carrying of bacteria germs, and one of the features of the improved pouring cap resides in the construction of the spout. For example, the cap has a backing of relatively thin paraffine paper, which, in order to form the spout, is folded to form the bottom and sides of the spout, and then cut with a die forming a blank as in Figure 7, said blank when open appearing in a shape as in Figure 6, and the part cut from the cap itself is connected to and acts as a support for the bottom of the spout (which is formed by the folding of the backing), the collapsible sides of the spout are also of relatively thin paraffine paper, such sides being likewise treated to guard against the carrying of germs, said backing, the bottom of the spout and its sides are in one piece.

It is to be understood that the particulars herein given are in no way limitative, and that while still keeping within the scope of the invention, any desired modification of details and proportions may be made in the construction of the milk bottle pouring cap according to circumstances.

The invention comprises further features and combination of parts to be hereinafter set forth, shown in the drawings and claimed.

In the drawings:—

Figure 1—is a perspective view of the upper end of a conventional type of milk bottle showing the improved pouring cap as applied, the pouring spout being closed.

Figure 2—is a perspective view of a milk bottle showing the same tilted on a substantial angle and the pouring spout open, showing how the milk may easily pour from the bottle and without pouring over the edge of the exterior of the mouth.

Figure 3—is a perspective view of a milk bottle pouring cap detached from the bottle, but also showing the spout open.

Figure 4—is a sectional view on line 4—4 of Figure 1, showing how the sides of the cap when closed collapse in positions under the bottom of the pouring spout.

Figure 5—is a sectional view on line 5—5 of Figure 1, showing more clearly how the transverse straight edge of the bottom of the pouring spout provides for a slight spacing between the edge and the exterior side of the mouth end of the bottle, and since this edge is not in contact with said surface, the carrying of germs at this point is reduced to a minimum.

Figure 6—is a plan view of a blank of relatively thin paraffine paper for backing up the end surface of the cap, the relatively thin paraffine paper forming a pouring spout with the collapsible sides.

Figure 7—is a plan view of the blank in Figure 6 but showing it in a folded condition, it having been cut by a die.

Figure 8—is a view of said relatively thin paraffine paper blank also showing it folded, with parts of V-shaped cutaway to illustrate how the blank may be cut by a die at first, and then subsequently folded, in lieu of folding and then cutting as in Figures 7 and 6.

Referring to the drawings,—1 identifies a conventional type of milk bottle, which is provided with the usual countersunk shoulder on the interior of the mouth of the bottle.

Engaging with a shoulder 2 is an improved cap 3, which may be constructed of any suitable fibre material, such as paraffine paper or cardboard properly treated to guard against carrying of bacteria germs. This cap has a pouring spout, and to construct the spout, the cap is provided with slits 5, which are in parallelism, as shown, and extend a substantial distance across the area of the cap. In providing these incisions, or cuts, or slits 5, a part 6 is caused to be formed. The cap is backed up by a relatively thin paraffine paper, conforming to the entire area of the circular disc cap, and this relatively thin paraffine paper is folded to provide the pouring spout 4 comprising the bottom 6ª and the sides 7, and after the paper is so folded as in Figure 7, it is cut by means of a die. The blank as in Figure 7, folded and then cut, is provided with flaps 7ª and 7ᵇ, and when the blank is opened it appears as in Figure 6, the flap 7ᵇ partly overlying the flaps 7ª. After the blank is folded and cut as in Figure 7, it is applied to the under surface of the cap, the bottom 6ª of the spout being fastened to the part 6 (caused to be formed by the slits 5), the part 6 acting as a support for the bottom of the pouring spout, particularly when the spout is open as in Figure 2, while the flaps 7ª and 7ᵇ are fastened adhesively to the under surface of the cap. The bottom 6ª of the pouring spout is fastened adhesively to the support 6.

The relatively thin paraffine paper which backs up the cap is also treated to guard against carrying bacteria germs, previous to being applied to the under face of the cap and the support 6. The sides 7 are arranged in folds as shown in Figure 4, hence the pouring spout is shown in a collapsed position. When the pouring spout is open as in Figure 2 the sides of the spout unfold as illustrated in Figures 2 and 3. The flaps 7ª and 7ᵇ are secured to the under surface of the cap as at 9 and 10. The adhesive connections of these parts as well as the bottom 6ª of the pouring spout to the support 6, are in such wise as to avoid any contact of the milk at these points, thereby preventing carrying of germs.

The edge of the bottom 6ª of the pouring spout and the edge of the part or support 6 are straight transversely, as shown at 11, and in this way the free edge of the bottom of the spout avoids engagement with the interior side of the mouth end of the bottle, likewise avoiding the carrying of germs. The idea of making the edges straight and, therefore, spacing such edge of the spout from the interior surface of the mouth end of the bottle, provides a space for the reception of a pointed implement in order to open the pouring spout to a position shown in Figure 2, it being obvious that when the spout is in such position the milk may easily pour from the bottle without in any way contacting with the interior surface of the mouth end of the bottle. An operator opening a bottle in this way necessarily avoids applying the end of the implement more to the centre of the cap, which would depress the cap open and splash the milk when pushed inwardly of the bottle. When the implement engages between the straight edges of the bottom 6ª and the support or part 6 and the side face of the opening of the milk bottle, the end of the implement engages with a shoulder.

As previously stated while this cap is provided with a pouring spout, it may be easily applied to all milk bottles with the now extensively used bottle capping machines, without any change in the construction of such machines, or without a specially constructed machine for capping bottles.

It will be noted that the spout is of substantial size, the support for the bottom of the spout being cut from a substantial portion of the cap. Furthermore the pouring spout may be opened to a position, where the bottom of the spout extends at right angles to the area of the cap, and due to the spout being of substantial size, the milk may pour from the bottle without flooding against the marginal edge of the mouth end of the bottle at a point opposite the hinged portion of the spout, therefore avoiding the carrying of germs in the milk.

As shown in Figure 8, the backing for the bottom of the cap is of such character that it is first cut by a die forming the V-shaped cutaway portions 7<sup>c</sup>, then the relatively thin paraffine paper backing is folded. In other words, when cutting the paper in the manner shown in Figure 8 the paper backing is simply slitted at 7<sup>c</sup>, so that when the backing is folded these slits open to form the V-shaped cutaway portions 7<sup>c</sup>. When the sides of the pouring spout are folded the sides counter-engage as in Figure 4.

The invention having been set forth, what is claimed is:

1. As an article of manufacture, a milk bottle pouring cap comprising a disc body having a pouring spout, a support for the bottom of the spout and being cut from the disc body and adapted to fold between the cuts when the spout is closed, and sides having V-shaped folds connecting the parallel side edges of the bottom of the spout and the side portions of said cuts, in order to limit the opening of the spout to a position with the bottom at right angles to the cap, the bottom of the pouring spout having a transverse straight edge being spaced from the interior surface of the mouth end of the bottle.

2. As an article of manufacture, a milk bottle pouring cap having a collapsible pouring spout extensible to a position with the bottom at right angles to the area of the cap, whereby the milk when pouring from the bottle may have a free and unobstructed passage, the bottom of the spout having a transverse straight edge being spaced from the interior surface of the mouth end of the bottle as and for the purpose set forth.

3. As an article of manufacture, a milk bottle cap comprising a cap proper provided with parallel slits and having a hinged part caused to be formed by the slits, and a paraffine backing for the cap provided with a collapsible spout, the spout and backing being in one piece, the bottom of the spout being connected to the hinged part.

4. As an article of manufacture a milk bottle cap having a backing of paraffine paper on its under surface, the backing having a folding pouring spout, the cap having a hinged part cut therefrom and connected to the bottom of the pouring spout.

5. As an article of manufacture, a milk bottle pouring cap provided with substantial transverse parallel slits with certain corresponding ends thereof cut through to the edge of the cap, the other corresponding ends of the slits terminating relatively short of corresponding opposite portions of the edge of the cap, a spout having a bottom connected to the cap adjacent the latter ends of the slits, and collapsible sides connecting the bottom and the cap adjacent said slits.

6. As an article of manufacture, a milk bottle pouring cap provided with a pouring spout having a bottom opening to and through the edge of the cap, one edge of the bottom of the spout being operatively connected to the cap and relatively short of the edge of the cap opposite where the edge of the spout terminates to and through the edge of the cap, said spout being relatively wide whereby milk may flow from the bottle without contacting the edge of the discharge opening of the bottle.

7. As an article of manufacture, a milk bottle pouring cap provided with a pouring spout having a bottom opening to and through the edge of the cap, one edge of the bottom of the spout being operatively connected to the cap relatively short of the edge of the cap opposite where the edge of the spout terminates to and through the edge of the cap, said spout being relatively wide whereby milk may flow from the bottle without contacting the edge of the discharge opening of the bottle, the edge of the bottom of the spout where it terminates to and through the edge of the cap being straight and out of contact with the surface of the discharge opening of the bottle, whereby an implement may engage therewith for opening the spout.

8. As an article of manufacture, a milk bottle cap comprising a cap proper provided with parallel slits cut to and through the edge of the cap and having a hinged part caused to be formed by the slits and connected to the cap relatively short of the edge of the cap opposite to where the slits are cut through the edge of the cap, and a paraffin backing for the cap provided with a collapsible spout, the spout and backing being in one piece, the bottom of the spout being connected to the hinged part.

9. As an article of manufacture, a milk bottle cap having a backing of paraffin paper under its surface, the backing having a folding pouring spout, the cap having a hinged part cut therefrom and secured to the bottom of the pouring spout, the corresponding edges of the bottom of the pouring spout and the hinged part terminating to and through the edge of the cap and being straight and relatively short of the edge of the bottle, whereby an implement may be inserted between the edge of the spout and the bottle for opening the spout.

In testimony whereof he affixes his signature hereto.

SAMUEL LEWIN.